(12) United States Patent
Hannuksela et al.

(10) Patent No.: US 8,275,051 B2
(45) Date of Patent: Sep. 25, 2012

(54) FEEDBACK BASED SCALABLE VIDEO CODING

(75) Inventors: Miska M. Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1145 days.

(21) Appl. No.: 12/103,611

(22) Filed: Apr. 15, 2008

(65) Prior Publication Data
US 2008/0260047 A1 Oct. 23, 2008

Related U.S. Application Data

(60) Provisional application No. 60/912,235, filed on Apr. 17, 2007.

(51) Int. Cl.
*H04N 7/12* (2006.01)
*H04W 4/00* (2009.01)

(52) U.S. Cl. .................................. 375/240.27; 370/329

(58) Field of Classification Search .................. 375/240, 375/240.24, 240.27, 316, 324, 340, 341; 714/774, 776, 785, 758, 755, 748
See application file for complete search history.

(56) References Cited

U.S. PATENT DOCUMENTS

| | | | | |
|---|---|---|---|---|
| 7,434,142 B2 * | 10/2008 | Cuttner et al. | ................. | 714/774 |
| 7,434,144 B2 * | 10/2008 | Cuttner et al. | ................. | 714/776 |
| 2002/0071485 A1 | 6/2002 | Caglar et al. | | |
| 2002/0150158 A1 | 10/2002 | Feng et al. | | |
| 2006/0146934 A1 | 7/2006 | Caglar et al. | | |

FOREIGN PATENT DOCUMENTS

| | | |
|---|---|---|
| RU | 2284671 | 9/2006 |
| WO | WO 02/17644 A | 2/2002 |
| WO | WO 02/32147 | 4/2002 |
| WO | WO 2006/111087 | 10/2006 |

OTHER PUBLICATIONS

Office Action for Korean Patent Application No. 10-2009-7023963, dated Mar. 18, 2011.
English Translation of Office Action for Korean Patent Application No. 10-2009-7023963, dated Mar. 18, 2011.
Wang et al., "SVC Feedback Based Coding", Apr. 23, 2007.

(Continued)

*Primary Examiner* — Hanh Nguyen
(74) *Attorney, Agent, or Firm* — Alston & Bird LLP

(57) ABSTRACT

A system and method provides a first integrity check code that can be calculated at an encoder and then sent to a decoder as a supplemental enhancement information message. The decoder can then calculate a second integrity check code over the actual received network abstraction layer units. This second integrity check code can be compared with the encoder-generated first integrity check code sent via the supplemental enhancement information message to indicate if in fact all of the transmitted NAL units from which the integrity check code was generated have been received without changes in their content. In addition, an error tracking algorithm is provided that can be run at either the encoder or the decoder in order to determine if the network abstraction layer units are correct in content at the decoder level. Therefore, pictures that are sent as just intra coded frames and pictures that are sent as just inter coded frames can both be checked for errors. Hence, error checking can be provided in those situations where the decoder fails to provide adequate information to the encoder as to what has actually been decoded.

43 Claims, 5 Drawing Sheets

OTHER PUBLICATIONS

Stcokhammer et al., "Error Control for Wireless Progressive Video Transmission," vol. 1, Sep. 2002, pp. 545-548.

Schaar et al., "Unequal Packet Loss Resilience for Fine-Granular-Scalability Video," vol. 3, No. 4, Dec. 1, 2001, pp. 381-394.

International Search Report for PCT Application No. PCT/IB2008051449.

Office Action from Chinese Application No. 200880020587.5, issued Nov. 3, 2011.

JVT-U209, "Joint Draft 1.0 on Multiview Video Coding", 21$^{st}$ JVT meeting, HangZhou, China, Oct. 20-27, 2006; pp. 1-20; available at http://ftp3.itu.ch/av-arch/jvt-site/2006_10_Hangzhou/JVT-U209.zip; downloaded from the internet Feb. 3, 2012.

English translation of Office Action for corresponding Russian Application No. 2009141935.

Office Action from Chinese Patent Application No. 200880020587.5, dated Jun. 18, 2012.

* cited by examiner

FEEDBACK BASED SCALABLE VIDEO CODING

FIELD OF THE INVENTION

The present invention relates generally to the field of scalable video coding. More particularly, the present invention relates to providing feedback via the use of integrity check codes.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). In addition, there are currently efforts underway with regards to the development of new video coding standards. One such standard under development is the SVC standard, which will become the scalable extension to H.264/AVC. Another standard under development is the multi-view coding standard (MVC), which is also an extension of H.264/AVC. Yet another such effort involves the development of China video coding standards.

A draft of the SVC standard is described in JVT-U202, "Joint Draft 8 with proposed changes", 21$^{st}$ JVT meeting, HangZhou, China, October 2006, available at http://ftp3.itu.ch/av-arch/jvt-site/2006_10_Hangzhou/JVT-U202.zip. A draft of the MVC standard is in described in JVT-U209, "Joint Draft 1.0 on Multiview Video Coding", 21 JVT meeting, HangZhou, China, October 2006, available at ftp3.itu.ch/av-arch/jvt-site/2006_10_Hangzhou/JVT-U209.zip.

Scalable media is typically ordered into hierarchical layers of data, where a video signal can be encoded into a base layer and one or more enhancement layers. A base layer can contain an individual representation of a coded media stream such as a video sequence. Enhancement layers can contain refinement data relative to previous layers in the layer hierarchy. The quality of the decoded media stream progressively improves as enhancement layers are added to the base layer. An enhancement layer enhances the temporal resolution (i.e., the frame rate), the spatial resolution, and/or simply the quality of the video content represented by another layer or part thereof. Each layer, together with all of its dependent layers, is one representation of the video signal at a certain spatial resolution, temporal resolution and/or quality level. Therefore, the term "scalable layer representation" is used herein to describe a scalable layer together with all of its dependent layers. The portion of a scalable bitstream corresponding to a scalable layer representation can be extracted and decoded to produce a representation of the original signal at a certain fidelity.

The concept of a video coding layer (VCL) and a network abstraction layer (NAL) is inherited from advanced video coding (AVC). The VCL contains the signal processing functionality of the codec e.g., mechanisms such as transform, quantization, motion-compensated prediction, loop filter, and inter-layer prediction. A coded picture of a base or enhancement layer consists of one or more slices. The NAL encapsulates each slice generated by the VCL into one or more NAL units.

Each SVC layer is formed by NAL units, representing the coded video bits of the layer. A Real Time Transport Protocol (RTP) stream carrying only one layer would carry NAL units belonging to that layer only. An RTP stream carrying a complete scalable video bit stream would carry NAL units of a base layer and one or more enhancement layers. SVC specifies the decoding order of these NAL units.

In some cases, data in an enhancement layer can be truncated after a certain location, or at arbitrary positions, where each truncation position may include additional data representing increasingly enhanced visual quality. In cases where the truncation points are closely spaced, the scalability is said to be "fine-grained," hence the term "fine grained (granular) scalability" (FGS). In contrast to FGS, the scalability provided by those enhancement layers that can only be truncated at certain coarse positions is referred to as "coarse-grained (granularity) scalability" (CGS). In addition, the draft SVC coding standard noted above can also support what is conventionally referred to as "medium grained (granular) scalability" (MGS). According to MGS, quality enhancement pictures are coded similarly to CGS scalable layer pictures, but can be indicated by high-level syntax elements as is similarly done with FGS layer pictures. It may be noted that enhancement layers can collectively include CGS, MGS, and FGS quality (SNR) scalability and spatial scalability.

According to H.264/AVC, an access unit comprises one primary coded picture. In some systems, detection of access unit boundaries can be simplified by inserting an access unit delimiter NAL unit into the bitstream. In SVC, an access unit may comprise multiple primary coded pictures, but at most one picture per each unique combination of dependency_id, temporal_id, and quality_id. A coded picture as described herein can refer to all of the NAL units within an access unit having particular values of dependency_id and quality_id. It is noted that the terms to be used in SVC can change. Therefore, what may be referred to as a coded picture herein may be subsequently referenced by another term, such as a layer representation.

SVC uses a similar mechanism as that used in H.264/AVC to provide hierarchical temporal scalability. In SVC, a certain set of reference and non-reference pictures can be dropped from a coded bitstream without affecting the decoding of the remaining bitstream. Hierarchical temporal scalability requires multiple reference pictures for motion compensation, i.e., there is a reference picture buffer containing multiple decoded pictures from which an encoder can select a reference picture for inter prediction. In H.264/AVC, a feature called sub-sequences enables hierarchical temporal scalability, where each enhancement layer contains sub-sequences and each sub-sequence contains a number of reference and/or non-reference pictures. The sub-sequence is also comprised of a number of inter-dependent pictures that can be disposed without any disturbance to any other sub-sequence in any lower sub-sequence layer. The sub-sequence layers are hierarchically arranged based on their dependency on each other and are equivalent to temporal levels in SVC. Therefore, when a sub-sequence in the highest sub-sequence layer is disposed, the remaining bitstream remains valid. In H.264/AVC, signaling of temporal scalability information is effectuated by using sub-sequence-related supplemental enhancement information (SEI) messages. In SVC, the temporal level hierarchy is indicated in the header of NAL units.

In addition, SVC uses an inter-layer prediction mechanism, whereby certain information can be predicted from layers other than a currently reconstructed layer or a next lower layer. Information that could be inter-layer predicted includes intra texture, motion, and residual data. Inter-layer motion prediction also includes the prediction of a block coding mode, header information, etc., where motion information from a lower layer may be used for predicting a higher layer. It is also possible to use intra coding in SVC, i.e., a prediction from surrounding macroblocks (MBs) or from co-located MBs of lower layers. Such prediction techniques do not employ motion information and hence, are referred to as intra prediction techniques. Furthermore, residual data from lower layers can also be employed for predicting the current layer.

When compared to previous video compression standards, SVC's spatial scalability has been generalized to enable the base layer to be a cropped and zoomed version of the enhancement layer. Moreover, quantization and entropy coding modules have also been adjusted to provide FGS capability. The coding mode is referred to as progressive refinement, where successive refinements of transform coefficients are encoded by repeatedly decreasing the quantization step size and applying a "cyclical" entropy coding akin to sub-bitplane coding.

SVC also specifies a concept of single-loop decoding. Single-loop decoding can be enabled by using a constrained intra texture prediction mode, where an inter-layer intra texture prediction can be applied to MBs for which the corresponding block of the base layer is located inside intra-MBs. At the same time, those intra-MBs in the base layer use constrained intra prediction. Therefore, in single-loop decoding, the decoder needs to perform motion compensation and full picture reconstruction only for the scalable layer desired for playback (i.e., the desired layer), thereby reducing decoding complexity. All layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is generally necessary for the decoding of most pictures, while a second decoding loop is applied to reconstruct the base representations. It should be noted that no FGS or MGS enhancement of an access unit is used in the reconstruction of a base representation of the access unit. The base representations are needed for prediction reference but not for output or display, and are reconstructed only for "key pictures." Base representation is typically used for inter prediction of the base representation of the next key picture. Periodical use of base representations in inter prediction stop potential drift and its temporal propagation caused by those FGS or MGS enhancement layer NAL units that have been truncated or lost in the transmission path from the encoder to the decoder.

The scalability structure in the SVC draft noted above is characterized by three syntax elements: temporal_id; dependency_id; and quality_id. The syntax element, temporal_id, is used to indicate the temporal scalability hierarchy or indirectly, the frame rate. A scalable layer representation comprising pictures of a smaller maximum temporal_id value has a smaller frame rate than a scalable layer representation comprising pictures of a greater maximum temporal_id. A given temporal layer typically depends on the lower temporal layers (e.g., the temporal layers with smaller temporal_id values) but do not generally depend on any higher temporal layer.

The syntax element, dependency_id, can be used to indicate the CGS inter-layer coding dependency hierarchy (which includes both SNR and spatial scalability). At any temporal level location, a picture of a smaller dependency_id value may be used for inter-layer prediction for coding of a picture with a larger dependency_id value.

The syntax element, quality_id, can be used to indicate the quality level hierarchy of a FGS or MGS layer. At any temporal location, and with an identical dependency_id value, a picture with a quality_id equal to QL uses the picture with a quality_id equal to QL-1 for inter-layer prediction. A coded slice with a quality_id larger than zero may be coded as either a truncatable FGS slice or a non-truncatable MGS slice.

For simplicity, all of the data units (e.g., NAL units or NAL units in the SVC context) in one access unit having an identical or matching dependency_id value are referred to as a dependency unit, where a temporal level hierarchy can be indicated in the header of a NAL unit.

One characteristic feature of SVC is that the FGS NAL units can be freely dropped or truncated and MGS NAL units can be freely dropped without affecting the conformance of the bitstream. However, when that FGS or MGS data has been used as an inter prediction reference during encoding, dropping or truncating the data would result in a mismatch during the reconstruction signal in the decoder side and the reconstruction signal in the encoder side. This mismatch can be referred to as drift, as noted above.

To control drift due to the dropping or truncating of FGS or MGS data, SVC can, in a certain dependency unit, store a base representation (by decoding only the CGS picture with quality_id equal to zero and all the depended-on lower layer data) in a decoded picture buffer. When encoding a subsequent dependency unit with the same dependency_id value, all of the NAL units, including FGS or MGS NAL units, use the base representation for an inter prediction reference. Consequently, all drift due to the dropping or truncating of FGS or MGS NAL units in an earlier access unit is held to this access unit. For other dependency units with the same value of dependency_id, all of the NAL units use the enhanced representations (decoded from NAL units with the greatest value of quality_id and the dependent-on lower layer data) for inter prediction reference. Such a technique can result in a high coding efficiency.

According to the SVC draft described in the JVT-U202 reference noted above, each NAL unit includes in the NAL unit header, a syntax element referred to as use_base_prediction_flag. When the use_base_prediction_flag value equals one, it specifies that decoding of the NAL unit uses the base representations of the reference pictures during the inter prediction process. The syntax element, store_base_rep_flag, specifies whether, when equal to one, or not (when equal to zero), to store the base representation of the current picture for future pictures to use for inter prediction, in addition to the enhanced representation.

In conversational video communications systems, such as video telephony, there is usually a feedback channel from a receiver to a sender. The feedback channel can be utilized for, among other things, recovering from transmission errors. Interactive error control messages from the receiver to the sender can be categorized as intra update requests, loss indications, and positive acknowledgements of correctly received and decoded data. The encoder can respond to such messages by intra coding or performing encoding using only those reference pictures that are correct in content. The encoder can also further improve compression efficiency and completeness of error correction if it tracks the spatial propagation of the indicated errors at the decoder side. Moreover the encoder can recover those areas that are damaged by spatial error propagation and use any undamaged areas as references for inter prediction.

Various literature and standards regarding interactive error control for low-latency video communication have been provided, where both ITU-T H.323/H.324-based video conferencing systems and RTP-based conferencing systems are considered.

ITU-T Recommendation H.245 is a control protocol for ITU-T H.323/324 video conferencing systems. Among other things, it specifies commands and indications used in a feedback channel from a receiver to a sender. A command according to H.245 can be a message that requires action but no explicit response. Alternatively, an indication according to H.245 can contain information, which does not require an action or response thereto. H.245 specifies messages for H.261, H.263, MPEG-1 video, and MPEG-2 video. In addition, the use of H.264/AVC in H.323/324 video conferencing systems is specified in ITU-T Recommendation H.241.

RTP can be used for transmitting continuous media data, such as coded audio and video streams in Internet Protocol (IP)-based networks. The Real-time Transport Control Protocol (RTCP) is a companion of RTP, i.e., RTCP can always be used to complement RTP when the network and application infrastructure allow it. RTP and RTCP are generally conveyed over the User Datagram Protocol (UDP), which in turn, is conveyed over IP. There are two versions of IP, i.e., IPv4 and IPv6, where one difference between the two versions has to do with the number of addressable endpoints.

RTCP can be used to monitor the quality of service provided by a network and to convey information about the participants in an on-going session. RTP and RTCP are designed for sessions that range from one-to-one communication to large multicast groups of thousands of endpoints. In order to control the total bitrate caused by RTCP packets in a multiparty session, the transmission interval of RTCP packets transmitted by a single endpoint is relative to the number of participants in the session. Each media coding format has a specific RTP payload format, which specifies how the media data is structured in the payload of an RTP packet.

A number of profiles have been specified for RTP, each of which specifies extensions or modifications to RTP that are specific to a particular family of applications. A popular profile is called the RTP profile for audio and video conferences with minimal control (RTP/AVP). The specification provides the semantics of generic fields in an RTP header for use in audio and video conferences. The specification also specifies the RTP payload format for certain audio and video codecs.

Another RTP profile is known as the audio-visual profile with feedback (RTP/AVPF). The RTP/AVPF allows terminals to send feedback faster than RTCP originally allowed and can therefore be used to convey messages for interactive error repair. If the number of participants in a session is smaller than a certain threshold, the Immediate Feedback mode of RTP/AVPF can be used. The Immediate Feedback mode allows each participant to report a feedback event almost immediately. The early RTCP mode of RTP/AVPF is applied when the number of participants is such that the Immediate Feedback mode cannot be used. Therefore, faster feedback than plain RTCP is enabled, but lacks the near immediate feedback of RTP/AVPF.

A simple method of recovery from transmission errors is to request a far-end encoder to encode erroneous areas in intra coding mode. In addition to recovery from transmission errors, a fast update picture command can be issued by a multipoint conference control unit (MCU) when there is a need to switch from one video originator to another during centralized multipoint conferencing. H.245 provides three video fast update commands: fast update commands for a picture; fast update commands for a group of blocks (GOB) of H.261 and H.263; and fast update commands for a number of MBs in raster scan order. These fast update commands are generally referred to as videoFastUpdatePicture, videoFastUpdateGOB, and videoFastUpdateMB, respectively.

The fast update commands require the encoder to update an indicated picture area, which in practice is interpreted as intra coding, although the encoder response to the fast update commands is not specified explicitly in H.245. In contrast to H.245, H.241 only allows for the fast update picture command for H.264/AVC, and specifies two alternative procedures to respond to a received fast update picture command. In a first procedure, an Instantaneous Decoding Refresh (IDR) picture and any referred parameter sets can be transmitted. In a second procedure the picture area is updated gradually, e.g., in a number of consecutive pictures. With intra coding, a recovery point SEI message is sent to indicate when the entire picture area is correct in content, and any referred parameter sets are also transmitted. This gradual recovery procedure can be used in error-prone transmission environments in which an IDR picture would be likely to experience transmission errors due to its large size relative to a typical inter picture. The codec control messages for RTP/AVPF include a full intra request command, which is equivalent to the video fast update picture command of H.245.

Intra coding resulting from the fast update commands reduces compression efficiency as compared to inter coding. In order to improve the compression efficiency, an encoder can choose a reference picture for inter prediction that is known to be correct and available based on feedback from the far-end decoder. This technique is often referred to as NEWPRED as described in "Study on Adaptive Reference Picture Selection Coding Scheme For the NEWPRED-Receiver-Oriented Mobile Visual Communication System" to Kimata et al. This technique requires that the video coding scheme allows the use of multiple reference pictures. Hence, H.263 Annex N, Annex U, or H.264/AVC, for example, can be used. In accordance with NEWPRED, two types of feedback messages can be utilized: negative acknowledgements (NACKs) for indicating that a certain packet or a certain picture or certain areas of a particular picture were not received correctly; and positive acknowledgements (ACKs) for indicating which pictures or parts of pictures are either correctly received or correct in content. A picture or a part thereof is correct in content if the coded data is correctly received and all of the data used for prediction is correct.

When NACKs are in use, an encoder conventionally uses any available reference picture for inter prediction, except for those pictures that are known to be erroneous based on the received NACK messages. Because end-to-end delay may be greater than the interval between two encoded pictures, the encoder may not know that some of the recently encoded reference pictures are not received correctly at the time of the encoding of a new picture. Thus, the NACK mode of NEWPRED stops error propagation in approximately one round-trip time period, similar to the fast update requests. When ACKs are in use, the encoder typically uses only those reference pictures for inter prediction that are known to be correct in content based on the received ACK messages.

Various mechanisms exist for conveying reference picture selection messages. The syntax for the messages can be specified within the control protocol in use. Alternatively, the control protocol can provide a generic framing mechanism to convey reference picture selection messages that are specified external to the control protocols. In accordance with control protocol-specified messages, H.245 includes loss commands that are specific to an entire picture (i.e., the lostPicture command). H.245 also includes loss commands that are specific to a number of MBs in raster scan order (i.e., the videoBadMBs command for use with H.263 Annex N). Lastly, H.245 includes loss commands that can explicitly indicate the picture in which a loss occurred (i.e., the lostPartialPicture command for use with H.263 Annex U).

The far-end video encoder must take corrective action, such as intra coding or selection of a correct reference picture as a response to a received loss command. The recovery reference picture command of H.245 requires the far-end encoder to use only the indicated pictures for prediction. In other words, it is similar to the ACK message described above. It should be noted that RTP/AVPF includes a generic NACK message, which is able to indicate the loss of one or more RTP packets, a picture loss indication, and a slice loss indication. The picture loss indication is the lostPicture command equivalent of H.245, and the slice loss indication is equivalent to the lostPartialPicture command of H.245.

As noted above, the payload syntax for back-channel messages can be specific to a codec or the syntax may be generic to any codec and the semantics of the generic syntax are specified for each codec separately. Examples of codec-specific back-channel syntax can include the messages specified in H.263 Annex N and Annex U and the NEWPRED upstream message of MPEG-4 Visual described above. Alternatively, ITU-T Recommendation H.271 specifies a generic back-channel message syntax for use with any video codec. Six messages are specified in H.271 including: an indication that one or more pictures are decoded without detected errors; an indication that one or more pictures are entirely or partially lost; and an indication that all or certain data partitions of a set of coding blocks of one picture are lost. In addition, the following messages are also specified in H.271: a cyclical redundancy check (CRC) value for one parameter set; a CRC value for all parameter sets of a certain type; and a reset request indicating that the far-end encoder should completely refresh the transmitted bitstream as if no prior video data had been received.

The semantics used for identifying a picture, the size of the coding block in terms of samples, and the definition of parameter sets are specific to the coding format. Therefore, H.271 specifies the semantics of the generic message syntax for H.261, H.263, and H.264/AVC. The back-channel messages specified in H.263 Annex N and Annex U as well as in H.271 can be conveyed in a separate logical channel on top of H.245. Similarly, RTP/AVPF includes a reference picture selection indication that carries a back-channel message according to a video coding standard, where the codec control messages extension of RTP/AVPF includes a video back-channel message that carries messages according to H.271.

Error tracking refers to a determination of whether a picture or part of a picture is correct in content. Alternatively, error tracking can refer to whether or not a picture or part of a picture is somehow not in accordance with associated information regarding data loss, corruption in transmission, and/or a coding prediction relationship. The coding prediction relationship includes the conventional inter prediction (i.e., motion compensation prediction), the conventional in-picture prediction (i.e., intra picture sample or coefficient prediction, motion vector prediction, and loop filtering), and inter-layer prediction in SVC context. Error tracking can either be performed by the encoder or the decoder.

For example, if a frame n is damaged and a corresponding back-channel feedback message arrives at the encoder when it is time to encode frame n+d, the encoder reconstructs the location of the damaged areas in frames n to n+d−1 in the decoder. The reconstruction can be based on the motion vectors in frames n+1 to n+d−1. Therefore, the encoder can avoid using any of the damaged areas in frames n to n+d−1 for inter prediction. An example of an error tracking algorithm is provided in H.263.

Error tracking can be further refined if the feedback messages contain information regarding which error concealment method the decoder used or which error concealment method has been pre-determined in a system. In response to receiving a feedback message concerning frame n, the encoder must reconstruct the decoding process exactly for frames n to n+d−1 so that the reference pictures at the encoder match the reference pictures in the decoder accurately. Support for joint error concealment and error tracking is included in H.245. To be more precise, the "not-decoded MBs indication" of H.245 signals can indicate which MBs were received erroneously and treated as not coded. In other words, the message indicates that a copy of the co-located MBs in the previous frame was used for error concealment. However, due to the computational requirements and complexity of error tracking associated with known error concealment, there are no relevant mechanisms other than the not-decoded MBs indication of H.245 available. Moreover, the not-decoded MBs indication is not widely used.

Use of a feedback message in association with pictures stored as reference but not output similarly as the base representations for FGS and MGS has been described in U.S. patent application Ser. No. 09/935,119 and U.S. patent application Ser. No. 11/369,321.

However, problems exist with the above-described conventional systems and methods. The problem is illustrated with the following example, where the example assumes a video communication system with live encoding and a feedback channel from the far-end decoder to the encoder. The following two access units in the bitstream can be considered:

Q1,n . . . Q1,n+m
Q0,n . . . Q0,n+m

Where, the notation is as follows:
  Q0,n—coded picture with quality_id equal to zero of access unit n
  Q1,n—coded picture with quality_id equal to one of access unit n
  Q0,n+m—coded picture with quality_id equal to zero of access unit n+m
  Q1,n+m—coded picture with quality_id equal to one of access unit n+m Access unit n is a key picture, i.e., the encoder sets the value of the store_base_rep_flag equal to 1. It can be assumed that all the quality layers of access unit n are successfully decoded and the far-end decoder sends a feedback message indicating the successful decoding to the encoder. The feedback message is received before encoding the next "key" access unit (n+m). When encoding the access unit n+m, the encoder can set a use_base_prediction_flag. The use_base_prediction_flag can be set to zero for (Q0,n+m) and (Q1,n+m), such that both of the coded pictures are predicted from (Q1,n) instead of (Q0,n) for improved coding efficiency. At the same time a store_base_rep_flag can be set to one for both (Q1,n+m) and (Q0,n+m), such that the base representation is stored for future pictures' inter prediction.

Therefore, a problem exists in that (Q1,n) may be lost during transmission. Alternatively, a media-aware network element (MANE) or the sender may adapt it by discarding some or all of the data of (Q1,n). That is, a detection of whether the access unit n is correctly decoded in its entirety is needed to create a valid feedback message from the far-end decoder to the encoder. However, according to the SVC draft in JVT-U202, the far-end decoder has no way to determine whether (Q1,n) was originally present in the bitstream or whether (Q1,n) contained originally more data. This is because the bitstream may be valid regardless of the presence of the FGS or MGS picture (Q1,n). Furthermore, when (Q1,n) contains FGS slices, there is no way to determine whether the NAL units have been truncated.

SUMMARY OF THE INVENTION

Various embodiments provide a system and method, where a first integrity check code can be calculated/generated at an encoder over a set of NAL units. The first integrity check code can then be sent to the decoder as an SEI message. The decoder can then calculate a second integrity check code over the actual received NAL units. This second integrity check code can be compared with the encoder-generated first integrity check code sent via the SEI message to indicate if in fact all of the transmitted NAL units from which the integrity check code was generated have been received without changes in their content. In addition, various embodiments provide an error tracking algorithm that can be run at either the encoder or the decoder in order to determine if the NAL units are correct in content at the decoder level. Therefore, pictures that are sent as just intra coded frames and pictures that are sent as just inter coded frames can both be checked for errors. According to various embodiments, error checking can be provided in those situations where the decoder fails to provide adequate information to the encoder as to what has actually been decoded.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
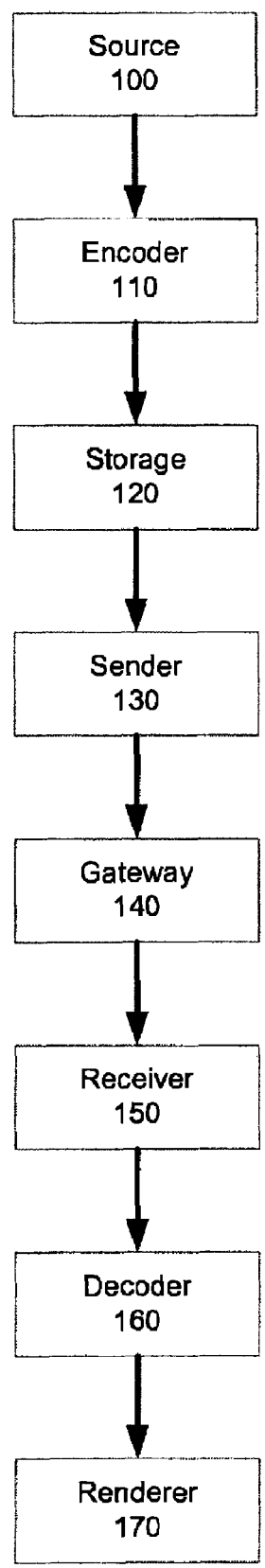
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typical real-time broadcast services comprise several streams (typically at least one audio, video and text sub-titling stream). It should also be noted that the system may include many encoders, but in the following only one encoder 110 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to a sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and the sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, the decoder 160, and the renderer 170 may reside in the same physical device or they may be included in separate devices.

It should be noted that the bitstream to be decoded can be received from a remote device located within virtually any type of network. Additionally, the bitstream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
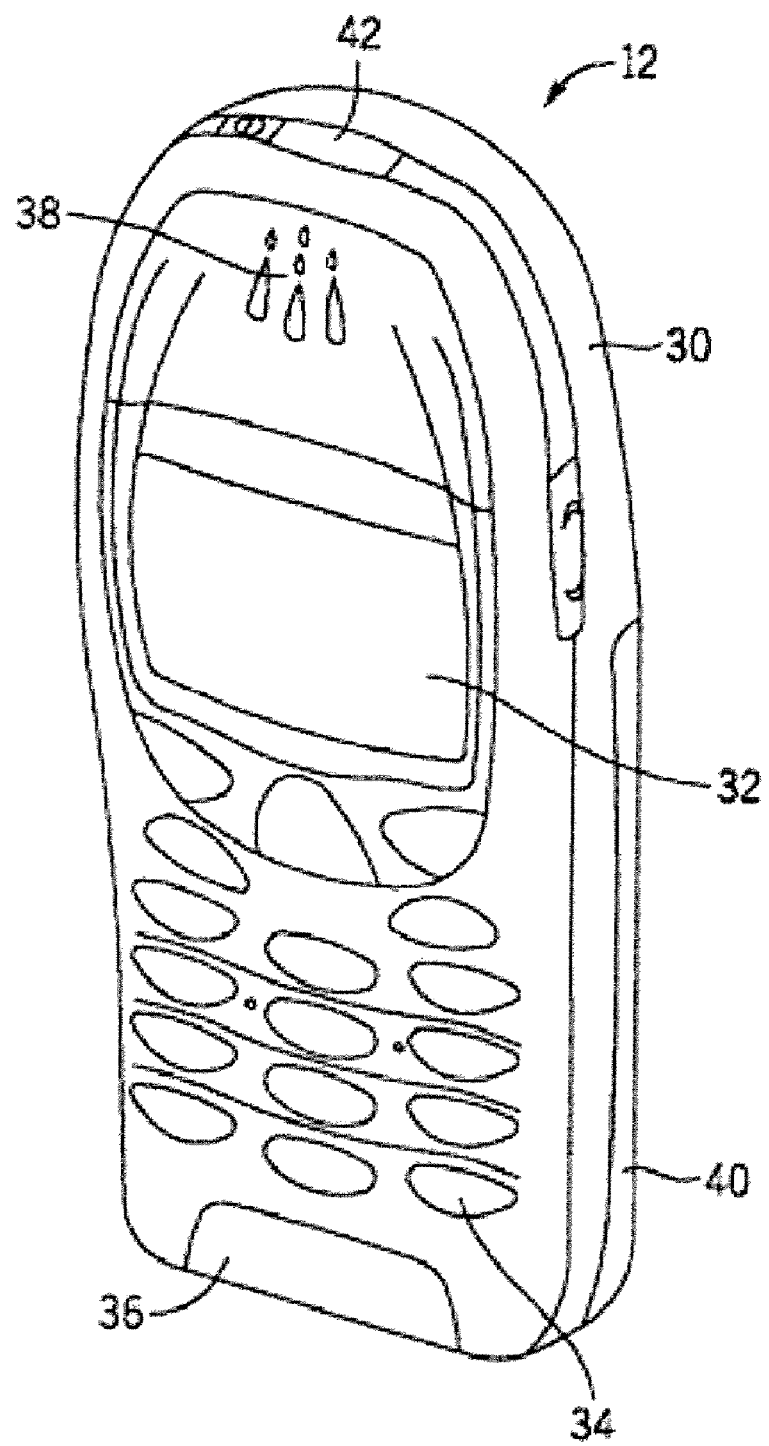
FIG. 2 is a perspective view of a mobile device that can be used in the implementation of the present invention.
Figure 3:
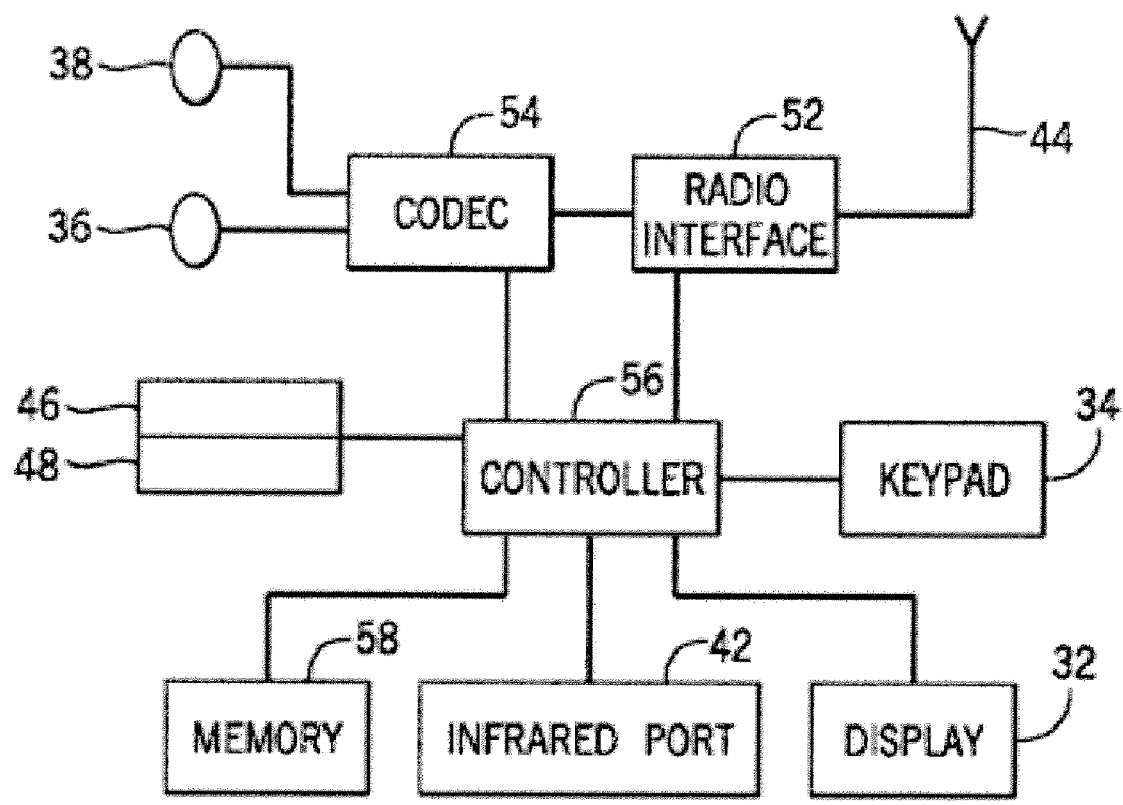
FIG. 3 is a schematic representation of the device circuitry of the mobile device of FIG. 2.

FIGS. 2 and 3 show one representative mobile device 12 within which the present invention may be implemented. It should be understood, however, that the present invention is not intended to be limited to one particular type of mobile device 12 or other electronic device. Some or all of the features depicted in FIGS. 2 and 3 could be incorporated into any or all of the devices represented in FIG. 1.

The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

As described above, a potential problem exists for scaleable video codecs as applied to the extension of the existing H.264 standard (H.264/SVC), where feedback to an encoder can, in certain circumstances, fail to provide adequate information to the encoder as to what has actually been decoded. This can be due to the layered nature of the bitstream, where the receiver may not receive all the layers of data (due to truncation of the bitstream along the communication path). The decoder is then ignorant of the fact that it has not received all of the layers, and decodes only what it has actually received. Therefore, the outputted video quality is only commensurate with the level of the received layered bitstream. The latest draft of the SVC standard in the JVT, as described above, has no provision for providing feedback during such scenarios.

Various embodiments provide a method of overcoming such limitations in the SVC standard by utilizing integrity check codes. A first integrity check code can be calculated/generated at an encoder over a set of NAL units. It may be noted that the set of NAL units can include at least one NAL unit with a quality_id greater than zero. The first integrity check code can then be sent to the decoder as an SEI message. The decoder can then calculate a second integrity check code over the actual received NAL units. This second integrity check code can be compared with the encoder-generated first integrity check code sent via the SEI message to conclude if in fact all of the transmitted NAL units from which the integrity check code was generated have been received without changes in their content. In addition, various embodiments provide an error tracking algorithm that can be run at either the encoder or the decoder in order to determine if the NAL units are correct in content at the decoder level. Therefore, pictures that are sent as just intra coded frames and pictures that are sent as just inter coded frames can both be checked for errors.

Figure 4:
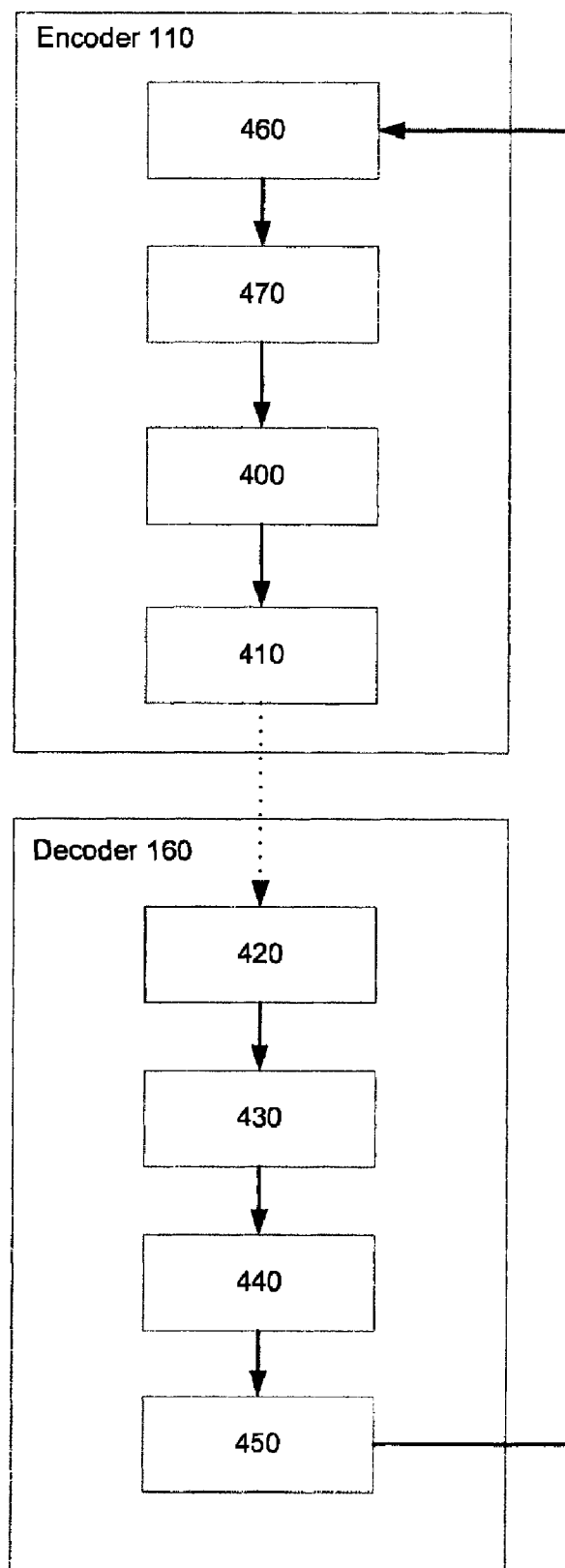
FIG. 4 is a flow chart illustrating processes performed in accordance with one embodiment.

FIG. 4 shows processes performed by an encoder, such as the encoder 110 of FIG. 1 and a decoder, such as the decoder 160 of FIG. 1. According to one embodiment, the encoder 110 encodes an input picture to an access unit including NAL units at 400. Furthermore, the encoder 110 generates a first integrity check code at 410, where the first integrity check code is calculated over a selected set of NAL units, including at least one NAL unit with a quality_id greater than zero. The first integrity check code and its scope (i.e., over which access unit(s) and scalable layers the code is calculated) are conveyed to the decoder, for example, as a SEI message embedded in a video bitstream. The decoder 160 decodes an access unit from a bitstream from the encoder 110 at 420. In addition, the decoder 160 receives the first integrity check code and the scope, and calculates a second integrity check code from the received set of NAL units having the indicated scope at 430. The decoder can compare the first and the second integrity check codes and determine whether all of the NAL units within the indicated scope are correctly received at 440.

Furthermore, the decoder 160 uses the determination to generate an ACK or a NACK feedback message with a scope (again, indicating which access unit(s) and scalable layers the message is concerned with) to the encoder 110 at 450. The feedback message in turn can indicate whether the NAL units within the indicated scope are correctly received (e.g., a type I feedback message) or correctly decoded in content (e.g., a type II feedback message). In order to generate a type II feedback message, the decoder 160 runs an error tracking algorithm to determine whether the NAL units are correct in content (not shown). The encoder 110 receives the feedback message at 460. When type I feedback messages are received, the encoder 110 runs an error tracking algorithm to determine whether the enhanced representation is correct in content at 470. Thereafter, the encoder 110 can encode another input picture to another access unit, repeating the operation at 400.

A simple picture-level error tracking algorithm can operate as follows. With regard to an intra picture, the intra picture can be considered to be correct in content if it is correctly received. For an inter picture, if the inter picture is correctly received and the associated reference pictures are correct in content, the inter picture can be considered to be correct in content.

Figure 5:
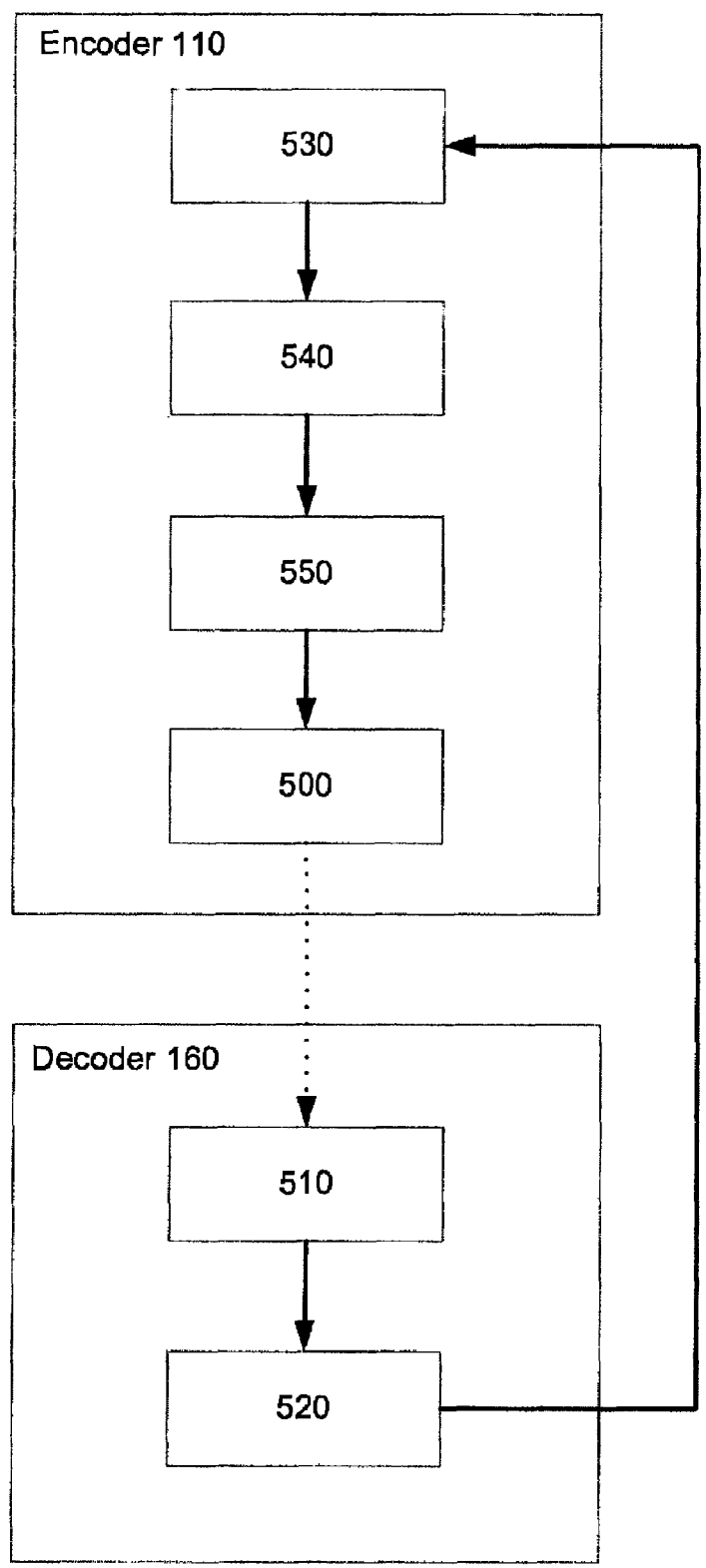
FIG. 5 is a flow chart illustrating processes performed in accordance with another embodiment.

Alternatively, FIG. 5 illustrates another embodiment, where upon the encoder 110 encoding an input picture to an access unit including NAL units at 500, the bitstream including access units is sent to the decoder 160. The decoder 160 decodes an access unit from the bitstream at 510, and at 520, the decoder 160 can generate a feedback message (e.g., a type III feedback message) including the scope of the selected NAL units and a first integrity check code from the received set of NAL units having the indicated scope, among other elements. Upon receiving the type III feedback message (including the scope and the first integrity check code) at 530, the encoder 110 calculates a second integrity check code over the same scope of NAL units and compares the first and second integrity check codes at to determine whether the NAL units have been correctly received at 540. Thereafter, if the feedback message concerned an inter picture, the encoder 110 can run an error tracking algorithm at 550 to determine whether the enhancement representation is correct in content.

If it is concluded that the enhanced representation is correct in content, the encoder 110 can encode a next dependency unit utilizing the enhanced representation for the NAL units with a quality_id greater than zero for improved coding efficiency, thus repeating the process/loop at 500. Moreover, for the NAL units in the dependency unit with a quality_id equal to zero, either the base representation or the enhancement representation can be used for inter prediction. The decision, whether the base representation or the enhancement representation is used, can be based on which representation provides better coding efficiency. At the same time, the base representation of the dependency unit can be stored for future use as inter prediction reference.

In a first embodiment, an integrity check code is derived for VCL NAL units with a quality_id greater than zero in a dependency unit. The integrity check code is deemed to be necessary only for the NAL units having a quality_id greater than zero. This is because the loss of NAL units that have a quality_id equal to zero and that contain primary coded slices of reference pictures can be detected by the decoder.

In another embodiment, an integrity check code is derived for VCL NAL units of a dependency unit regardless of the value of the quality_id. This embodiment can enable integrity detection without decoding or parsing the NAL units having a quality_id equal to zero.

In yet another embodiment, an integrity check code is derived for each set of VCL NAL units of a dependency unit having a particular quality_id value. This embodiment enables integrity detection of each quality layer separately.

In still another embodiment, an integrity check code is derived for more than one access unit, where each of the more than one access units can be a part of any subset of the NAL units specified above. That is, for the set of access units for which the integrity check code is calculated, the appropriate integrity check code described above can be applied thereto. This embodiment can be used to enable error tracking more easily.

As described above, the integrity check code can be associated with a scope characterizing the NAL units used to derive the integrity check code. For example, the scope may include the dependency_id and the range of quality_id's of those NAL units that were used to derive the integrity check code.

Furthermore, the encoder can include the integrity check data (i.e., the integrity check code and its scope) as an SEI message to the encoded bitstream. An example of the SEI message syntax and semantics is as follows.

| quality_layer_integrity_check( payloadSize ) { | C | Descriptor |
|---|---|---|
| num_info_entries_minus1 | 5 | ue(v) |
| for( i = 0; i <= num_info_entries_minus1; i++ ) { | | |
| entry_dependency_id[ i ] | 5 | u(3) |
| quality_layer_crc[ i ] | 5 | u(16) |
| } | | |
| } | | |

The information conveyed in the above SEI message concerns an access unit. When present, this SEI message can appear before any coded slice NAL unit or any coded slice data partition NAL unit of a corresponding access unit. The num_info_entries_minus1 syntax element (incremented by 1) can indicate the number of information entries following this syntax element. The value can be in a range from 0 to 7, inclusive. The entry_dependency_id[i] syntax element can indicate the dependency_id value of the dependency unit whose quality layer integrity check code is indicated by the following syntax element. It should be noted that the instances of entry_dependency_id[i] can appear in an ascending order according to their respective values. A quality_layer_crc[i] syntax element can represent the CRC for all of the NAL units with a quality_id greater than zero in the dependency unit.

With regard to the quality_layer_crc[i], its value can be equal to the value of a variable, crcVal, that can be obtained by performing the following pseudo code process.

```
qNalUnits[pLen   ] = 0
qNalUnits[pLen + 1] = 0
crcVal = 0xFFFF
for( bitIdx = 0; bitIdx < ( pLen + 2 ) * 8; bitIdx++ ) {
  crcMsb = ( crcVal >> 15 ) & 1
  bitVal = (qNalUnits[bitIdx >> 3] >> ( 7 - ( bitIdx & 7 ) ) ) & 1
  crcVal = ( ( ( crcVal << 1 ) + bitVal ) & 0xFFFF ) ^ ( crcMsb * 0x1021 )
}
```

It should be noted that the variable, qNalUnits, is a string of bytes, where the beginning of the string of bytes contains: data for which the CRC is computed; the variable pLen that indicated the number of bytes of the data for which the CRC is computed; and the string of bytes of the variable, qNalUnits, where qNalUnits is of sufficient length to allow for two additional zero-valued bytes to be appended to the end of the data for which the CRC is computed. In addition, the qNalUnits variable can contain a concatenation in network byte order, of the bytes of all of the NAL units with a quality_id greater than zero in the dependency unit, where the bytes themselves are in a decoding order. It should also be noted that the integrity check data, i.e., the checksum, can be calculated in other CRC varieties, or according to other checksums, including but not limited to, SHA1 and MD5.

Lastly, the feedback message can be signalled either in-band or using an out-of-band protocol. One example for such a protocol would be RTCP receiver reports, where portions of this protocol can inherently support synchronization with a video sender (e.g., RTCP in the form of the timestamp). Within other environments, the feedback message can contain an identification of the picture or access unit over which the checksum was generated.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. In particular, the invention can be used with any media coding format providing similar characteristics as FGS and MGS in SVC. It should be noted that a characteristic of FGS and MGS relevant to various embodiments is that there is a data unit (a NAL unit with quality_id greater than 0 in FGS and MGS) such that the media samples can be decoded even if the data unit is discarded or truncated.

What is claimed is:

1. A method comprising:
   encoding a picture to a first access unit, by:
   generating, by an encoder, a first integrity check code over a first set of data units, the first set of data units comprising at least a portion of the first access unit, wherein the first set of data units includes at least one data unit having a quality identifier greater than zero in a dependency unit such that the picture is decodable even if the at least one data unit is at least one of discarded and truncated, wherein the quality identifier indicates the quality level of the at least one data unit, and
   conveying, by the encoder, at least the first integrity check code to a decoder.

2. The method of claim 1 further comprising, encoding a second picture to a second access unit, the second access unit comprising a second set of data units including at least one data unit being dependent upon at least one data unit of the first access unit, wherein a second integrity check code is generated in accordance with the at least one data unit included in the second access unit and the at least one data unit of the first access unit.

3. The method of claim 1, wherein the first set of data units includes data units having varying quality_identifier values in a dependency unit.

4. The method of claim 1, wherein the first set of data units includes data units having matching, particular quality_identifier values in a dependency unit.

5. The method of claim 1 further comprising, generating additional integrity check codes over additional access units for additional sets of media samples, wherein the first access unit and each of the additional access units include one of at least one data unit having a quality_identifier value greater than zero in a dependency unit, data units having varying quality_identifier values in a dependency unit, and data units having matching, particular quality_identifier values in a dependency unit.

6. The method of claim 1, wherein the first set of data units is characterized by a scope indicating the first set of data units over which the first integrity check code is calculated.

7. The method of claim 6, wherein the scope is indicated by the dependency identifier.

8. The method of claim 7, wherein the scope and the first integrity check code are included in the first access unit.

9. The method of claim 1 further comprising:
   receiving a scope and one of a positive acknowledgement feedback message and a negative acknowledgement feedback message, the one of the positive acknowledgement feedback message and the negative acknowledgement feedback message indicating whether the first set of data units within the scope are correct in content, wherein the encoding is performed in accordance with at least one of the positive acknowledgement feedback message and the negative acknowledgement feedback message.

10. The method of claim 9, wherein the scope characterizes data units of the set of data units over which the first integrity check code is generated.

11. The method of claim 1 further comprising:
    receiving a scope and one of a positive acknowledgement feedback message and a negative acknowledgement feedback message, the one of the positive acknowledgement feedback message and the negative acknowledgement feedback message indicating whether the first set of data units within the scope are correct in content; and
    performing error tracking to determine whether the set of data units are correct in content, wherein the encoding is performed in accordance with at least one of one of the positive acknowledgement feedback message and the negative acknowledgement feedback message and the error tracking.

12. The method of claim 11, wherein the scope characterizes data units of the set of data units over which the first integrity check code is generated.

13. A computer program product embodied on a non-transitory computer readable medium, comprising computer code configured to perform the processes of claim 1.

14. An apparatus, comprising:
    a processor; and
    a memory operatively connected to the processor and including:
    computer code configured to encode a picture to a first access unit by at least generating a first integrity check code over a first set of data units, the first set of data units comprising at least a portion of the first access unit, wherein the first set of data units includes at least one data unit having a quality_identifier greater than zero in a dependency unit such that the picture is decodable even if the at least one data unit is at least one of discarded and truncated, wherein the quality_identifier indicates the quality level of the at least one data unit, and wherein a dependency unit comprises the data units of the first set of data units having each an identical dependency identifier value, and
    computer code configured to convey at least the first integrity check code to a decoder.

15. The apparatus of claim 14, wherein the memory unit further comprises computer code configured to encode a second picture to a second access unit, the second access unit comprising a second set of data units including at least one data unit being dependent upon at least one data unit of the first access unit, wherein a second integrity check code is generated in accordance with the at least one data unit included in the second access unit and the at least one data unit of the first access unit.

16. The apparatus of claim 14, wherein the first set of data units includes data units having varying quality_identifier values in a dependency unit.

17. The apparatus of claim 14, wherein the first set of data units includes data units having matching, particular quality_identifier values in a dependency unit.

18. The apparatus of claim 14 wherein the memory further comprises computer code configured to generate additional integrity check codes over additional access units for additional sets of media samples, wherein the first access unit and each of the additional access units include one of at least one data unit having a quality_identifier value greater than zero in a dependency unit, data units having varying quality_identifier values in a dependency unit, and data units having matching, particular quality_identifier values in a dependency unit.

19. The apparatus of claim 14, wherein the memory further comprises computer code configured to:
receive a scope and one of a positive acknowledgement feedback message and a negative acknowledgement feedback message, the one of the positive acknowledgement feedback message and the negative acknowledgement feedback message indicating whether the first set of data units within the scope are correct in content, wherein the encoding is performed in accordance with at least one of the positive acknowledgement feedback message and the negative acknowledgement feedback message.

20. The apparatus of claim 14, wherein the memory further comprises computer code configured to:
receive a scope and one of a positive acknowledgement feedback message and a negative acknowledgement feedback message, the one of the positive acknowledgement feedback message and the negative acknowledgement feedback message indicating whether the set of data units within the scope are at least one of correctly received and correct in content; and
perform error tracking to determine whether the set of data units are correct in content, wherein the encoding is performed in accordance with at least one of one of the positive acknowledgement feedback message and the negative acknowledgement feedback message and the error tracking.

21. A method comprising:
decoding a first access unit, comprising a picture by:
receiving a first scope characterizing a first set of data units comprising at least a portion of the first access unit and a first integrity check code associated with the first access unit, the first integrity check code being generated over the first set of data units;
generating a second integrity check code over the first set of data units, wherein the first set of data units includes at least one data unit having a quality_identifier greater than zero in a dependency unit wherein the picture is decodable if the at least one data unit is at least one of discarded and truncated, wherein the quality_identifier indicates the quality level of the at least one data unit, and wherein a dependency unit comprises the data units of the first set of data units having each an identical dependency identifier value.

22. The method of claim 21, further comprising performing error tracking to determine whether the first set of data units are correct in content.

23. The method of claim 21 further comprising, decoding a second picture encoded to a second access unit, the second access unit comprising a second set of data units including at least one data unit being dependent upon at least one data unit of the first access unit, wherein a third integrity check code is generated in accordance with the at least one data unit included in the second access unit and the at least one data unit of the first access unit.

24. The method of claim 21, wherein the first set of data units includes data units having varying quality_identifier values in a dependency unit.

25. The method of claim 21, wherein the first set of data units includes data units having matching, particular quality_identifier values in a dependency unit.

26. The method of claim 21 further comprising, decoding additional integrity check codes over additional access units for additional sets of media samples, wherein the first access unit and each of the additional access units include one of at least one data unit having a quality_identifier value greater than zero in a dependency unit, data units having varying quality_identifier value in a dependency unit, and data units having matching, particular quality_identifier values in a dependency unit.

27. The method of claim 21 further comprising:
comparing the first and second integrity check codes to determine whether all data units in the set of data units are correctly received; and
generating within a subsequent scope, one of a positive acknowledgement feedback message and a negative acknowledgement feedback message, the one of the positive acknowledgement feedback message and the negative acknowledgement feedback message indicating whether the first set of data units within the first scope are at least one of correctly received and correct in content.

28. A computer program product embodied on a non-transitory computer readable medium, comprising computer code configured to perform the processes of claim 21.

29. An apparatus, comprising:
a processor; and
a memory operatively connected to the processor and including:
computer code configured to decode a first access unit comprising a picture by receiving a first scope characterizing a first set of data units comprising at least a portion of the first access unit and a first integrity check code associated with the first access unit, the first integrity check code being generated over the first set of data units, and generating a second integrity check code over the first set of data units, wherein the first set of data units includes at least one data unit having a quality_identifier greater than zero in a dependency unit wherein the picture is decodable if the at least one data unit is at least one of discarded and truncated, wherein the quality_identifier indicates the quality level of the at least one data unit, and wherein a dependency unit comprises the data units of the first set of data units having each an identical dependency identifier value.

30. The apparatus of claim 29, wherein the memory further comprises computer code configured to perform error tracking to determine whether the first set of data units are correct in content.

31. The apparatus of claim 29, wherein the memory further comprises computer code configured to decode a second picture encoded to a second access unit, the second access unit comprising a second set of data units including at least one data unit being dependent upon at least one data unit of the first access unit, wherein a third integrity check code is generated in accordance with the at least one data unit included in the second access unit and the at least one data unit of the first access unit.

32. The apparatus of claim 29, wherein the first set of data units includes data units having varying quality_identifier values in a dependency unit.

33. The apparatus of claim 29, wherein the first set of data units includes data units having matching, particular quality_identifier values in a dependency unit.

34. The apparatus of claim 29, wherein the memory further comprises computer code configured to decode additional integrity check codes over additional access units for additional sets of media samples, wherein the first access unit and each of the additional access units include one of at least one data unit having a quality_identifier value greater than zero in a dependency unit, data units having varying quality_identifier values in a dependency unit, and data units having matching, particular quality_identifier values in a dependency unit.

35. The apparatus of claim 29, wherein the memory unit further comprises:
   computer code configured to compare the first and second integrity check codes to determine whether all data units in the set of data units are correctly received; and
   computer code configured to generate within a subsequent scope, one of a positive acknowledgement feedback message and a negative acknowledgement feedback message, the one of the positive acknowledgement feedback message and the negative acknowledgement feedback message indicating whether the first set of data units within the first scope are at least one of correctly received and correct in content.

36. A system, comprising:
   an encoder configured to encode a picture to a first access unit by at least generating a first scope and a first integrity check code over a first set of data units, the first set of data units comprising at least a portion of the first access unit, wherein the first set of data units includes at least one data unit having a quality_identifier greater than zero in a dependency unit such that the picture is decodable even if the at least one data unit is at least one of discarded and truncated, wherein the quality_identifier indicates the quality level of the at least one data unit, and wherein a dependency unit comprises the data units of the first set of data units having each an identical dependency identifier value; and
   a decoder configured to decode the first access unit comprising a picture by receiving a first scope characterizing a first set of data units comprising at least a portion of the first access unit and a first integrity check code associated with the first access unit, the first integrity check code being generated over the first set of data units, and generating a second integrity check code over the first set of data units, wherein the first set of data units includes at least one data unit having a quality_identifier greater than zero in a dependency unit wherein the picture is decodable if the at least one data unit is at least one of discarded and truncated, wherein the quality_identifier indicates the quality level of the at least one data unit, and wherein a dependency unit comprises the data units of the first set of data units having each an identical dependency identifier value.

37. The system of claim 36, wherein the decoder generates a feedback message to be sent to the encoder based on the first integrity check code and the second integrity check code.

38. The system of claim 36, wherein the feedback message is a negative acknowledgement when the first integrity check code and the second integrity check code are unequal.

39. The system of claim 36, wherein the feedback message is a positive acknowledgement when the first integrity check code and the second integrity check code are equal.

40. A system, comprising:
   a decoder configured to decode a first access unit comprising a picture, generate a scope and a feedback message indicating whether a set of data units comprising at least a portion of the first access unit are correct in content, and generate a first integrity check code over the set of data units within the scope; and
   an encoder configured to receive the first integrity check code and the feedback message, generate a second integrity check code over the set of data units, compare the first and second integrity check codes to determine whether all data units in the set of data units are correctly received, and, perform error tracking to determine whether the set of data units are correct in content.

41. The system of claim 40, wherein the feedback message is a negative acknowledgement when the first integrity check code and the second integrity check code are unequal.

42. The system of claim 40, wherein the feedback message is a positive acknowledgement when the first integrity check code and the second integrity check code are equal.

43. A method comprising:
   generating, by a decoder, a first integrity check code over at least one data unit from a first set of data units wherein a first access unit is comprised of the first set of data units;
   generating, by the decoder, a feedback message including the first integrity check code, wherein the decoding the first access unit to a set of media samples is allowed when the at least one data unit is at least one of discarded or truncated; and
   conveying, by the decoder, the feedback message to an encoder.

* * * * *

UNITED STATES PATENT AND TRADEMARK OFFICE
CERTIFICATE OF CORRECTION

PATENT NO. : 8,275,051 B2
APPLICATION NO. : 12/103611
DATED : September 25, 2012
INVENTOR(S) : Hannuksela et al.

It is certified that error appears in the above-identified patent and that said Letters Patent is hereby corrected as shown below:

In the Claims:

Column 15,
Line 65, "dependency identifier", should read --dependency_identifier--.

Column 16,
Lines 43 and 46, "quality_identifier", both occurrences, should read --quality identifier--.

Column 17,
Lines 46 and 49, "quality_identifier", should read --quality identifier--.

Column 18,
Lines 41, 44 and 45, "quality_identifier", both occurrences, should read --quality identifier--.

Column 19,
Lines 29, 32, 33 and 45, "quality_identifier", each occurrence, should read --quality identifier--.

Column 20,
Lines 1 and 2, "quality_identifier", should read --quality identifier--;
Line 40, "wherein the decoding", should read --wherein decoding--.

Signed and Sealed this
Twenty-third Day of April, 2013

Teresa Stanek Rea
*Acting Director of the United States Patent and Trademark Office*